United States Patent
Torobu

(10) Patent No.: US 11,022,859 B2
(45) Date of Patent: Jun. 1, 2021

(54) LIGHT EMISSION CONTROL APPARATUS, LIGHT EMISSION CONTROL METHOD, LIGHT EMISSION APPARATUS, AND IMAGING APPARATUS

(71) Applicant: SONY CORPORATION, Tokyo (JP)

(72) Inventor: Jun Torobu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/480,133

(22) PCT Filed: Jan. 23, 2018

(86) PCT No.: PCT/JP2018/001853
§ 371 (c)(1),
(2) Date: Jul. 23, 2019

(87) PCT Pub. No.: WO2018/142993
PCT Pub. Date: Aug. 9, 2018

(65) Prior Publication Data
US 2019/0346743 A1    Nov. 14, 2019

(30) Foreign Application Priority Data

Feb. 6, 2017   (JP) .............................. JP2017-019525

(51) Int. Cl.
*G03B 13/36*   (2021.01)
*H04N 5/225*   (2006.01)
(Continued)

(52) U.S. Cl.
CPC ............. *G03B 13/36* (2013.01); *G02B 7/282* (2013.01); *G03B 15/05* (2013.01); *H04N 5/2251* (2013.01)

(58) Field of Classification Search
CPC .......... H04N 5/2251; H04N 5/232061; H04N 5/23293; H04N 5/2256; H04N 5/232121;
(Continued)

(56) References Cited

U.S. PATENT DOCUMENTS 8,326,136 B1 * 12/2012 Clark ..................... G03B 15/05
                                                    396/56
8,326,141 B1 * 12/2012 Clark ................. H04N 5/23241
                                                   396/198
(Continued)

FOREIGN PATENT DOCUMENTS

JP     09-015490 A     1/1997
JP     10-123408 A     5/1998
(Continued)

OTHER PUBLICATIONS

International Search Report and Written Opinion of PCT Application No. PCT/JP2018/001853, dated May 1, 2018, 8 pages of ISRWO.

*Primary Examiner* — Lin Ye
*Assistant Examiner* — John H Morehead, III
(74) *Attorney, Agent, or Firm* — Chip Law Group

(57) ABSTRACT

Provided is a light emission control apparatus, a light emission control method, a light emission apparatus, and an imaging apparatus that make it possible to emit AF assist light with a more appropriate amount of light. A light emission unit is capable of emitting AF (Auto Focus) assist light when capturing a static image and illumination light when capturing a moving image. A light-amount setting unit sets the amount of AF assist light to a light emission control unit, the light amount being obtained in accordance with a distance to an object to be focused on or specification by a user, and the light emission control unit controls light emission of the AF assist light in accordance with the setting.

14 Claims, 14 Drawing Sheets

(51) Int. Cl.
*G02B 7/28* (2021.01)
*G03B 15/05* (2021.01)

(58) Field of Classification Search
CPC ........ H04N 5/2354; H04N 7/18; G03B 13/36; G03B 15/05; G03B 7/16; G02B 7/282; G02B 7/28
See application file for complete search history.

(56) References Cited

U.S. PATENT DOCUMENTS

| | | | | |
|---|---|---|---|---|
| 2009/0202234 | A1* | 8/2009 | Ichimiya | G02B 7/28 396/89 |
| 2010/0158495 | A1* | 6/2010 | Spence | H04N 5/23212 396/106 |
| 2010/0284675 | A1* | 11/2010 | Machida | H04N 5/23293 396/106 |
| 2013/0016277 | A1* | 1/2013 | Ito | G03B 7/17 348/353 |
| 2013/0258133 | A1* | 10/2013 | Nakagawa | H04N 5/232933 348/222.1 |
| 2017/0019597 | A1* | 1/2017 | Oyama | H04N 5/23245 |

FOREIGN PATENT DOCUMENTS

| | | |
|---|---|---|
| JP | 10-206942 A | 8/1998 |
| JP | 2001-324667 A | 11/2001 |
| JP | 2017-028376 A | 2/2017 |

* cited by examiner

LIGHT EMISSION CONTROL APPARATUS, LIGHT EMISSION CONTROL METHOD, LIGHT EMISSION APPARATUS, AND IMAGING APPARATUS

CROSS REFERENCE TO RELATED APPLICATIONS

This application is a U.S. National Phase of International Patent Application No. PCT/JP2018/001853 filed on Jan. 23, 2018, which claims priority benefit of Japanese Patent Application No. JP 2017-019525 filed in the Japan Patent Office on Feb. 6, 2017. Each of the above-referenced applications is hereby incorporated herein by reference in its entirety.

TECHNICAL FIELD

The present disclosure relates to a light emission control apparatus, a light emission control method, a program, a light emission apparatus, and an imaging apparatus, and particularly to a light emission control apparatus, a light emission control method, a program, a light emission apparatus, and an imaging apparatus that make it possible to emit AF assist light with a more appropriate amount of light.

BACKGROUND ART

In general, an imaging apparatus having an autofocus function performs processing of applying AF (Auto Focus) assist light to an object to focus on the object. As described above, the imaging apparatus includes a light emission unit that emits the AF assist light in addition to a flash unit that applies strobe light to the object. Further, in the past, an imaging apparatus includes a light emission unit that applies illumination light when capturing a moving image to an object in some cases.

For example, Patent Literature 1 discloses a flash light emission apparatus including a flash light emitting unit that emits flash light when performing flash imaging, an LED (Light Emitting Diode) light emission unit that emits light having a color temperature different from that of flash light, and an AF assist light unit for distance measurement.

CITATION LIST

Patent Literature

Patent Literature 1: Japanese Patent Application Laid-open No. 1998-206942

DISCLOSURE OF INVENTION

Technical Problem

Incidentally, when performing autofocusing in a bright state in which the AF assist light as described above is applied to a person, the person feels dazzling and uncomfortable in some cases because the AF assist light is in the visible light region. In this regard, it has been necessary to emit AF assist light with such an appropriate light amount that prevents the person from feeling dazzling.

The present disclosure has been made in view of the above-mentioned circumstances and it is an object thereof to make it possible to emit AF assist light with a more appropriate amount of light.

Solution to Problem

A light emission control apparatus according to an aspect of the present disclosure includes a light-amount setting unit that sets an amount of AF (Auto Focus) assist light; and a light emission control unit that controls emission of the AF assist light in accordance with the setting by the light-amount setting unit.

A light emission control method or a program according to an aspect of the present disclosure includes the steps of: setting an amount of AF (Auto Focus) assist light; and controlling emission of the AF assist light in accordance with the setting.

A light emission apparatus according to an aspect of the present disclosure includes: a light emission unit capable of emitting AF (Auto Focus) assist light; a light-amount setting unit that sets an amount of the AF assist light; and a light emission control unit that performs control on the light emission unit in accordance with the setting by the light-amount setting unit.

An imaging apparatus according to an aspect of the present disclosure includes a light emission apparatus including a light emission unit capable of emitting AF (Auto Focus) assist light, a light-amount setting unit that sets an amount of the AF assist light, and a light emission control unit that performs control on the light emission unit in accordance with the setting by the light-amount setting unit.

In the aspect of the present disclosure, the amount of AF assist light is set, and emission of the AF assist light is controlled.

Advantageous Effects of Invention

In accordance with the aspect of the present disclosure, it is possible to emit AF assist light with a more appropriate amount of light.

MODE(S) FOR CARRYING OUT THE INVENTION

Hereinafter, a specific embodiment to which the present technology is applied will be described in detail with reference to the drawings.

<Configuration Example of Imaging Apparatus>

Figure 1:
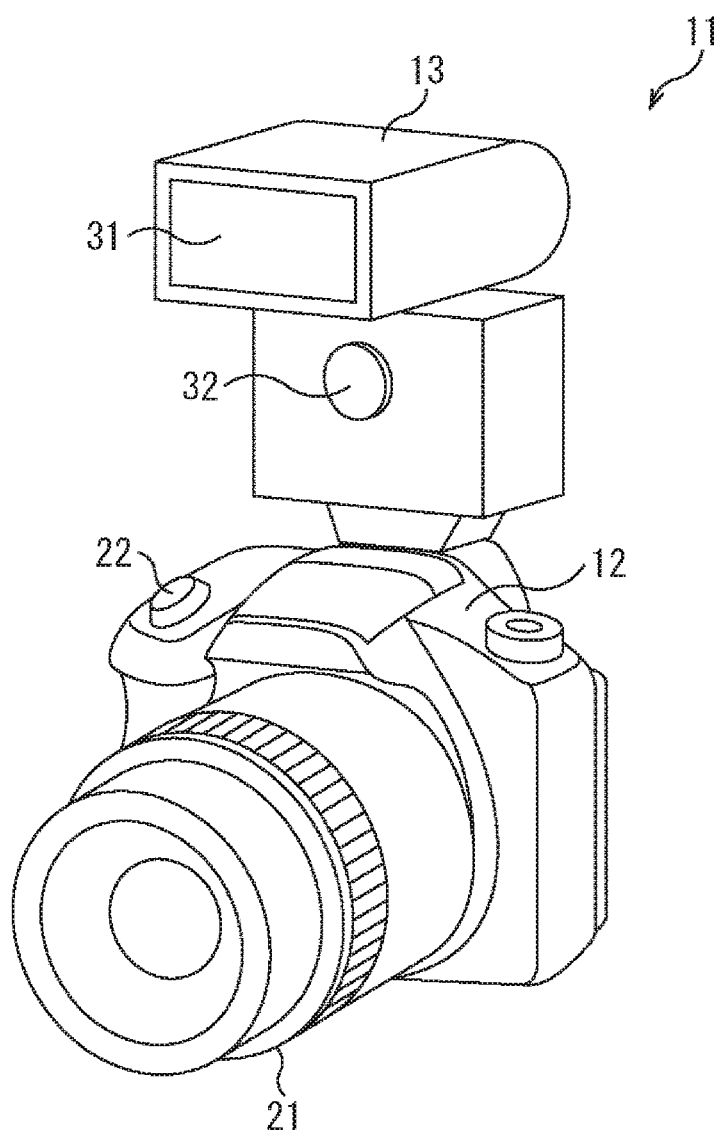
FIG. 1 is a perspective view showing a configuration example of an embodiment of an imaging apparatus to which the present technology is applied.

FIG. 1 is a perspective view showing a configuration example of an embodiment of an imaging apparatus to which the present technology is applied.

An imaging apparatus 11 shown in FIG. 1 is configured by attaching an external light emission apparatus 13 to an imaging apparatus main body 12. For example, the imaging apparatus main body 12 includes an accessory shoe that is an attachment mechanism for mechanically and electronically connecting various external apparatuses, and the external light emission apparatus 13 is attached to the imaging apparatus main body 12 by using the accessory shoe.

As illustrated, the imaging apparatus main body 12 includes an AF lens 21 and a shutter button 22, and the external light emission apparatus 13 includes a flash unit 31 and a light emission unit 32.

The AF lens 21 executes, when performing imaging by the imaging apparatus 11, autofocusing by driving a lens so that an object is automatically focused on.

The shutter button 22 is an operation unit to be operated by a user, when performing imaging by the imaging apparatus 11. For example, the user is capable of instructing to execute autofocusing by the AF lens 21 by performing an operation (half pressing) of keeping the shutter button 22 half pressed. Further, by performing an operation (full press) of completely pressing the shutter button 22, the user is capable of instructing to acquire a static image at the timing of the operation.

The flash unit 31 incorporates a stroboscope that instantaneously emits strong flash light, and applies flash light to an object when capturing a static image by the imaging apparatus 11 in, for example, an environment in which brightness necessary for imaging is insufficient.

The light emission unit 32 incorporates a light emitting device such as an LED (Light Emitting Diode) capable of applying light of arbitrary brightness, and emits illumination light to be applied to an object as illumination when, for example, capturing a moving image by the imaging apparatus 11. Further, the light emission unit 32 emits light (hereinafter, referred to as AF assist light) to be auxiliarily applied to an object for performing distance measurement of autofocusing when capturing a static image by the imaging apparatus 11. As described above, the light emission unit 32 is configured to be capable of switching between AF assist light and illumination light, and emitting any one of them as necessary.

That is, the light emission unit 32 is, for example, designed to be used as a video light for applying illumination light while having a function of applying AF assist light. As described above, the external light emission apparatus 13 is configured to be capable of performing different types of light emission by one light emission unit 32, and can be used for various applications by controlling a plurality of LEDs incorporated in the light emission unit 32.

In the imaging apparatus 11 configured as described above, for example, when a user half-presses the shutter button 22, the light emission unit 32 applies AF assist light to an object and autofocusing by the AF lens 21 is executed using the AF assist light. Then, in the case where the user full-presses the shutter button 22 after the object is focused on, the flash unit 31 applies flash light to the object and a static image is acquired in accordance with the timing.

Figure 2:
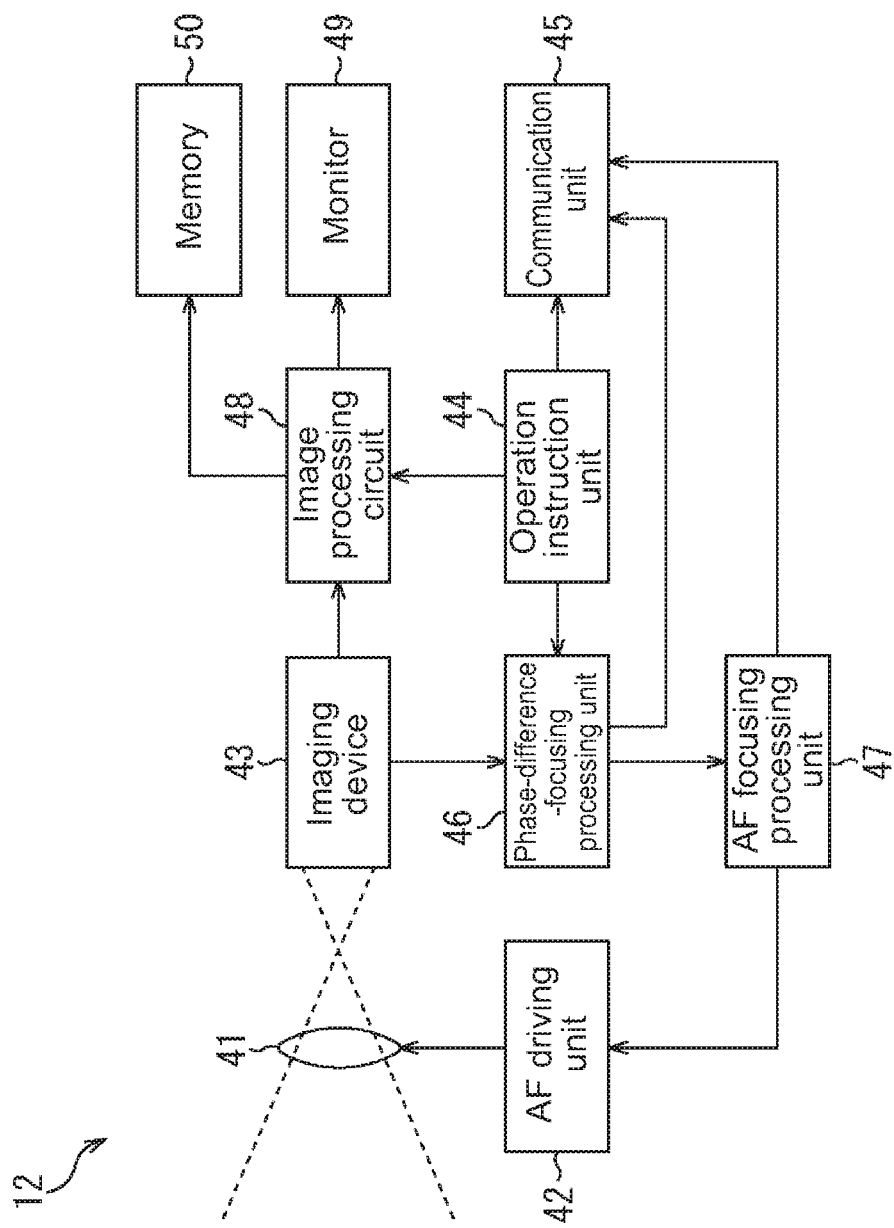
FIG. 2 is a block diagram showing a configuration example of an imaging apparatus main body.

FIG. 2 is a block diagram showing a configuration example of the imaging apparatus main body 12.

As shown in FIG. 2, the imaging apparatus main body 12 includes an optical system 41, an AF driving unit 42, an imaging device 43, an operation instruction unit 44, a communication unit 45, a phase-difference-focusing processing unit 46, an AF focusing processing unit 47, an image processing circuit 48, a monitor 49, and a memory 50.

The optical system 41 and the AF driving unit 42 are incorporated into, for example, the AF lens 21 in FIG. 1. The optical system 41 includes a plurality of lenses including a focus lens, and collects light to enter the imaging device 43 to form an image of an object on the sensor surface of the imaging device 43. The AF driving unit 42 includes a drive mechanism that drives the focus lens of the optical system 41, and drives the focus lens so that the image of the object formed on the sensor surface of the imaging device 43 by the optical system 41 is focused on.

The imaging device 43 includes, for example, a CMOS (Complementary Metal Oxide Semiconductor) image sensor, and outputs a pixel signal corresponding to the amount of light from the object formed on the sensor surface on which a plurality of pixels are arranged in an array. Further, a predetermined number of pixels among the plurality of pixels arranged on the sensor surface of the imaging device 43 have a function as image plane phase difference pixels capable of outputting a phase-difference signal representing the amount of deviation of the image formed on the sensor surface.

The operation instruction unit 44 outputs, in the case where the shutter button 22 in FIG. 1 or another operation unit (not shown) is operated, a control signal that instructs to execute an operation according to the content of the operation.

For example, in the case where an operation of half-pressing the shutter button 22 is performed, the operation instruction unit 44 transmits, to the external light emission apparatus 13 via the communication unit 45, a control signal that instructs to start emission of AF assist light, and supplies a control signal that instructs to execute autofocusing to the phase-difference-focusing processing unit 46. Further, in the case where an operation of full-pressing the shutter button 22, the operation instruction unit 44 transmits, to the external light emission apparatus 13 via the communication unit 45, a control signal that instructs to apply flash light, and supplies a control signal that instructs to acquire a static image to the image processing circuit 48. Further, in the case where an operation of instructing an operation unit (not shown) to turn on/off illumination to an object when capturing a moving image, the operation instruction unit 44 transmits, to the external light emission apparatus 13 via the communication unit 45, a control signal that instructs to turn on/off emission of the illumination light.

The communication unit 45 performs various types of communication with the external light emission apparatus 13 in FIG. 1, and transmits, to the external light emission apparatus 13, the control signal supplied from the operation instruction unit 44, for example.

In the case where the control signal that instructs to execute autofocusing is supplied from the operation instruction unit 44, the phase-difference-focusing processing unit 46 performs, on the basis of the amount of deviation of the image formed on the sensor surface obtained from the phase-difference signal supplied from the image plane phase difference pixel of the imaging device 43, phase-difference-focusing processing of calculating the distance to an object to be focused. Then, the phase-difference-focusing processing unit 46 supplies distance information (lens-distance-encoder information) representing the distance calculated by the phase-difference-focusing processing to the AF focusing processing unit 47, and transmits it to the external light emission apparatus 13 via the communication unit 45.

The AF focusing processing unit 47 performs, in accordance with the distance information supplied from the phase-difference-focusing processing unit 46, AF focusing processing for focusing on an object at the distance indicated by the distance information. For example, the AF focusing processing unit 47 obtains, in accordance with the distance information, the movement direction and movement amount of the focus lens of the optical system 41 necessary for focusing on the object, and instructs the movement direction and movement amount on the AF driving unit 42. The AF driving unit 42 drives the focus lens of the optical system 41 in accordance therewith, and thus, the image of the object is focused on the sensor surface of the imaging device 43. Further, in order to improve the accuracy of autofocusing, the AF focusing processing unit 47 is capable of finely adjusting the position of the focus lens of the optical system 41 by the AF driving unit 42 so that the contrast of the object in the image captured by the imaging device 43 peaks.

Then, after focusing on the object, the AF focusing processing unit 47 finishes the AF focusing processing, and transmits, to the external light emission apparatus 13 via the communication unit 45, a control signal that instructs to finish emission of the AF assist light. Note that at this time, the AF focusing processing unit 47 may cause the monitor 49 to display a mark indicating that the object is focused on, or a speaker (not shown) to output an electronic sound indicating that the object is focused on.

The image processing circuit 48 performs image processing of acquiring an image on the basis of the pixel signal supplied from the imaging device 43, and supplies the image acquired in real time to the monitor 49. Further, the image processing circuit 48 performs various types of image processing (e.g., camera shake correction processing or noise removal processing) on a static image acquired at the timing when the control signal that instructs to acquire the static image is supplied from the operation instruction unit 44, and supplies the acquired static image to the memory 50.

The monitor 49 includes, for example, a display device such as a liquid crystal panel and an organic EL (Electro Luminescence) panel, and displays the image supplied from the image processing circuit 48.

The memory 50 is incorporated in, for example, the imaging apparatus main body 12, or detachably attached to the imaging apparatus main body 12, and stores (records) the image supplied from the image processing circuit 48.

Figure 3:
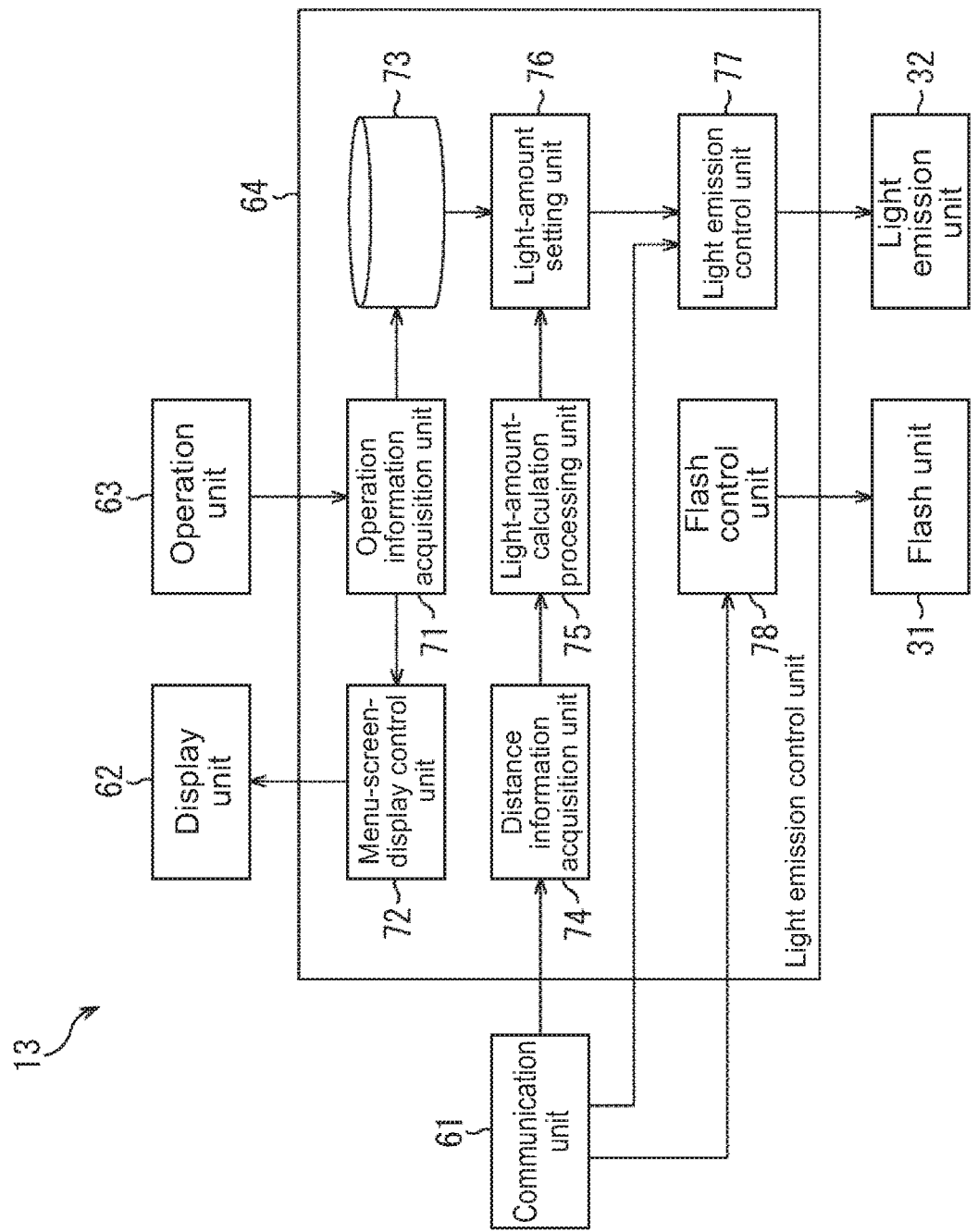
FIG. 3 is a block diagram showing a configuration example of an external light emission apparatus.

FIG. 3 is a block diagram showing a configuration example of the external light emission apparatus 13.

As shown in FIG. 3, the external light emission apparatus 13 includes the flash unit 31, the light emission unit 32, a communication unit 61, a display unit 62, an operation unit 63, and a light emission control unit 64. Then, the light emission control unit 64 includes an operation information acquisition unit 71, a menu-screen-display control unit 72, a storage unit 73, a distance information acquisition unit 74, a light-amount-calculation processing unit 75, a light-amount setting unit 76, a light emission control unit 77, and a flash control unit 78.

As described above with reference to FIG. 1, the flash unit 31 is capable of applying flash light to an object and the light emission unit 32 is capable of emitting AF assist light and illumination light.

The communication unit 61 performs various types of communication with the communication unit 45 in FIG. 2, receives, for example, the control signal transmitted from the imaging apparatus main body 12, and supplies it to the light emission control unit 64. For example, the communication unit 61 supplies, to the light emission control unit 77 of the light emission control unit 64, a control signal that instructs to start or finish emission of AF assist light, and supplies, to the flash control unit 78 of the light emission control unit 64, a control signal that instructs to emit flash light. Further, the communication unit 61 supplies, the distance information acquisition unit 74 of the light emission control unit 64, the distance information transmitted from the phase-difference-focusing processing unit 46.

The display unit 62 includes a display device such as a liquid crystal panel and an organic EL panel, and displays a menu screen (see FIGS. 5A and 5B described below) or the like according to display control by the menu-screen-display control unit 72.

The operation unit 63 includes various buttons, a control key, and the like to be operated by a user, and supplies an operation signal according to the operation performed thereon to the operation information acquisition unit 71.

The operation information acquisition unit 71 acquires, on the basis of the operation signal supplied from the operation unit 63, operation information indicating the content of the operation performed by the user, and performs various types of processing according to the operation. For example, when acquiring the operation information that indicates to display a menu screen, the operation information acquisition unit 71 performs, on the menu-screen-display control unit 72, processing necessary for displaying the menu screen on the display unit 62.

Further, when acquiring the operation information indicating that various types of setting have been performed using the menu screen, the operation information acquisition unit 71 performs processing of supplying the setting content to the storage unit 73 to store it. For example, in the external light emission apparatus 13, which of user's specification and distance information is to be used regarding the amount of AF assist light can be designated using the menu screen, and the operation information acquisition unit 71 causes, in accordance with the user's operation, the storage unit 73 to store the setting content indicating which of the user's specification and distance information is to be used regarding the amount of AF assist light.

The menu-screen-display control unit 72 controls, on the basis of the processing performed by the operation information acquisition unit 71, display of the menu screen displayed on the display unit 62.

The storage unit 73 stores, on the basis of the processing performed by the operation information acquisition unit 71, various types of setting content set by the user. For example, the storage unit 73 stores setting content indicating which of the user's specification and distance information is to be used regarding the amount of AF assist light, setting content indicating the amount of AF assist light (light-amount information) according to the user's specification, and the like.

The distance information acquisition unit 74 acquires, via the communication unit 61, the distance information calculated in the phase-difference-focusing processing by the phase-difference-focusing processing unit 46, and supplies it to the light-amount-calculation processing unit 75.

The light-amount-calculation processing unit 75 calculates, in accordance with a formula for calculating the optimal light amount according to the distance to the object, on the basis of the distance information supplied from the distance information acquisition unit 74, the amount of AF assist light to be emitted from the light emission unit 32. For example, the light-amount-calculation processing unit 75 is capable of obtaining the optimal amount of AF assist light according to the distance to the object, by performing, in accordance with the formula of the light amount (lux)=100× log 2(distance information/5.7), difference calculation from the light amount set to the light amount of 100 lux and distance of 5.7 m.

Figure 4:
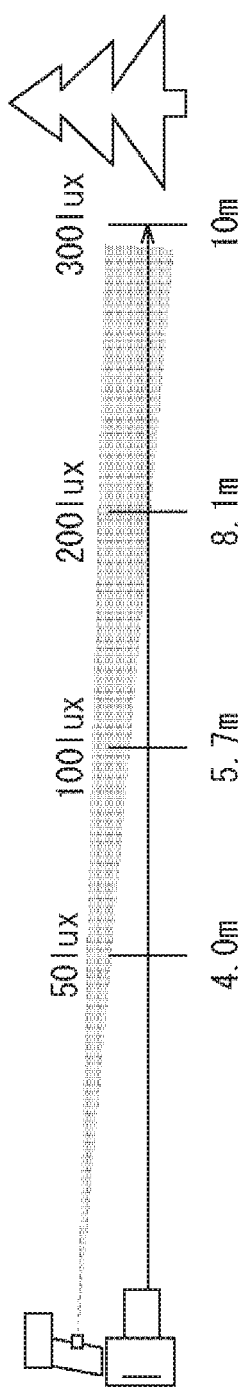
FIG. 4 is a diagram describing an amount of AF assist light calculated from distance information.

As a result, as shown in FIG. 4, the amount of AF assist light is calculated as, for example, 50 lux when the distance information is 4.0 m, 100 lux when the distance information is 5.7 m, 200 lux when the distance information is 8.1 m, and 300 lux when the distance information is 10 m. Then, the light-amount-calculation processing unit 75 supplies the amount of AF assist light (light-amount information) obtained in this way to the light-amount setting unit 76. Note that the above-mentioned formula is merely an example, and the amount of AF assist light may be obtained using another formula. In addition, a table in which the amount of AF assist light and the distance information are associated with each other may be referred to.

The light-amount setting unit 76 refers to the setting content stored in the storage unit 73, and sets the amount of AF assist light (inputs the light-amount information indicating the light amount) to the light emission control unit 77. For example, in the case where the setting content indicating which of the user's specification and distance information is to be used regarding the amount of AF assist light is set to use the light amount according to the user's specification, the light-amount setting unit 76 reads, from the storage unit 73, the amount of AF assist light specified by the user by operating the operation unit 63, and sets it to the light emission control unit 77. Meanwhile, in the case where the setting content indicating which of the user's specification and distance information is to be used regarding the amount of AF assist light is set to use the light amount according to the distance information, the light-amount setting unit 76 sets, to the light emission control unit 77, the amount of AF assist light calculated by the light-amount-calculation processing unit 75.

When the control signal that instructs to start emission of AF assist light is supplied via the communication unit 61, the light emission control unit 77 performs control (supply of current in the amount corresponding to the light amount) on the light emission unit 32 to emit AF assist light in the amount adjusted in accordance with the setting by the light-amount setting unit 76. Further, when the control signal that instructs to finish the emission of AF assist light is supplied via the communication unit 61, the light emission control unit 77 performs control on the light emission unit 32 to turn off the AF assist light.

When the control signal that instructs to emit flash light is supplied via the communication unit 61, the flash control unit 78 perform control on the flash unit 31 to apply flash light to an object. Note that at this time, also the flash control unit 78 may adjust, on the basis of the distance information regarding the distance to the object, the amount of flash light emitted by the flash unit 31.

Figure 5A:
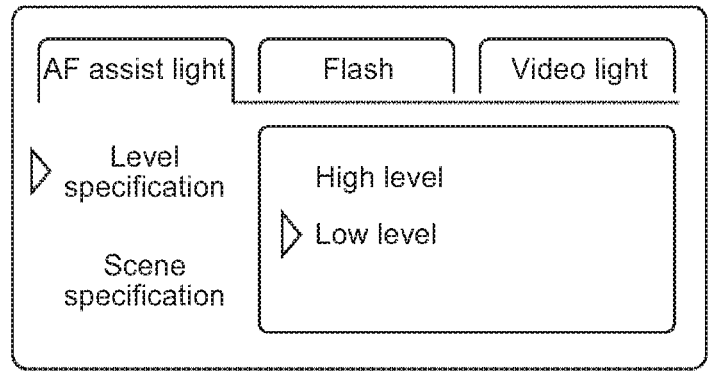
FIGS. 5A and 5B are diagrams showing an example of a menu screen.
Figure 5B:
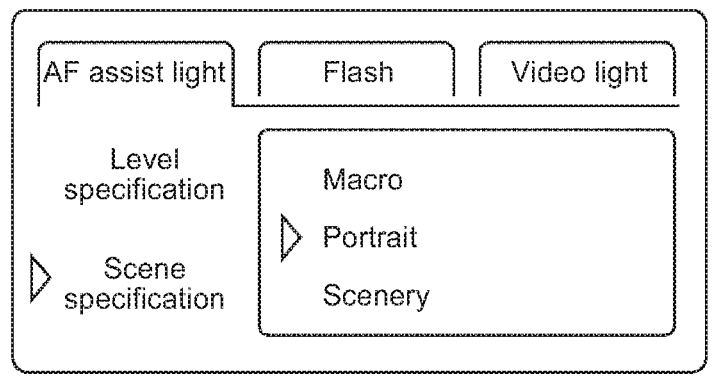

In FIGS. 5A and 5B, an example of the menu screen displayed on the display unit 62 of the external light emission apparatus 13 is shown.

For example, in the external light emission apparatus 13, a user is capable of specifying the light amount level of AF assist light. In FIG. 5A, a menu screen in which the amount of AF assist light is specified in two stages, i.e., a high level and a low level, is shown. For example, the user is capable of specifying any one of the high level and the low level by specifying the up and down movement of a cursor using the operation unit 63.

Then, in the external light emission apparatus 13, for example, a large light amount (e.g., 300 lux) is associated with the high level, and a small light amount (e.g., 100 lux) is associated with the low level. Then, the operation information acquisition unit 71 causes the storage unit 73 to store, as the setting content of the amount of AF assist light, the light amount associated with the specified light amount level, in accordance with the user's operation. Then, the light-amount setting unit 76 sets, to the light emission control unit 77, the amount of AF assist light associated with the high level or low level.

Note that in the external light emission apparatus 13, the amount of AF assist light may be specified in two or more (multiple) stages (e.g., 10 stages) of levels, and the user is capable of inputting a numerical value for specifying the stage of the light amount level by operating the operation unit 63. In this case, in accordance with the user's operation, the operation information acquisition unit 71 causes the storage unit 73 to store, as the setting content of the amount of AF assist light, the light amount associated with the stage of the specified level, and the light-amount setting unit 76 sets the amount of AF assist light to the light emission control unit 77.

Further, in the external light emission apparatus 13, the user specifies an imaging scene (imaging mode), and thus, the amount of AF assist light according to the specified imaging scene can be set. In FIG. 5B, a menu screen in which any of the macro, portrait, and scenery is to be specified as the imaging scene is shown.

Then, in the external light emission apparatus 13, the minimum light amount is associated with the macro of the imaging scene because the distance to an object is very small. Further, in the external light emission apparatus 13, a small light amount is associated with the portrait of the imaging scene because the distance to the object is somewhat small, and a large light amount is associated with the scenery of the imaging scene because the distance to the object is large. Then, in accordance with the user's operation, the operation information acquisition unit 71 causes the storage unit 73 to store, as he setting content of the amount of AF assist light, the light amount associated with the specified imaging scene.

<Light Emission Control Processing>

Figure 6:
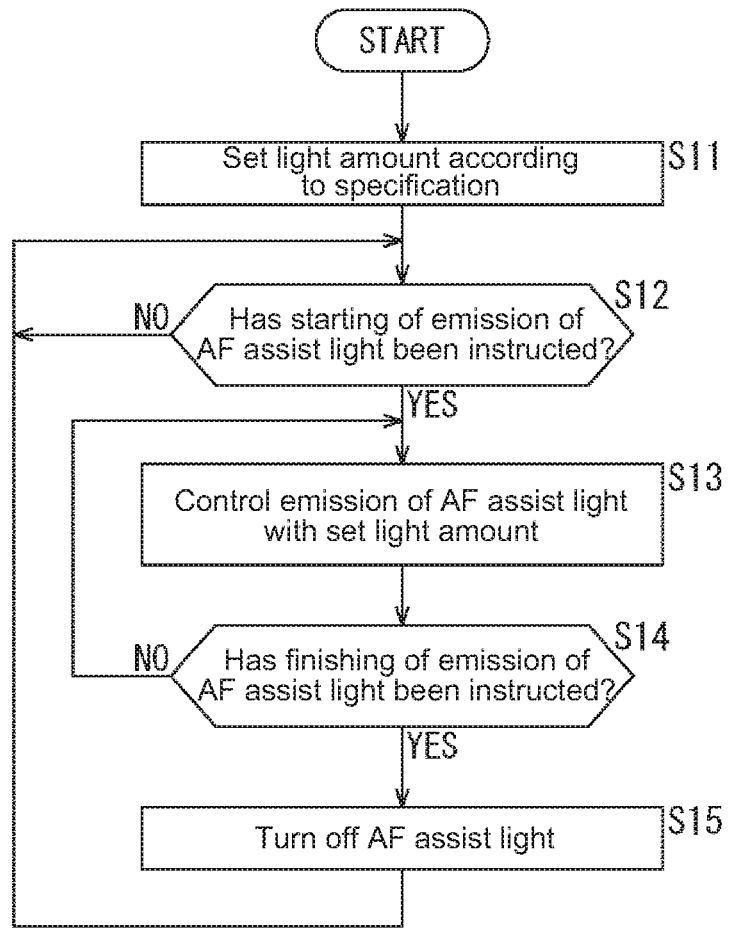
FIG. 6 is a flowchart describing light emission control processing of controlling emission of AF assist light with a light amount according to specification by a user.

Light emission control processing of controlling emission of AF assist light with the light amount according to the user's specification will be described with reference to the flowchart of FIG. 6.

For example, in the case where the power of the external light emission apparatus 13 is turned on, the light-amount setting unit 76 refers to the setting content indicating which of the user's specification and distance information is to be used regarding the amount of AF assist light, which is stored in the storage unit 73, and it is set to use the light amount according to the user's specification, this processing is started.

In Step S11, the light-amount setting unit 76 reads, from the storage unit 73, the amount of AF assist light specified by the user by operating the operation unit 63, and sets the light amount according to the specification to the light emission control unit 77.

In Step S12, the light emission control unit 77 determines whether or not starting of emission of AF assist light is instructed, and stands by without performing processing until it determines that starting of emission of AF assist light has been instructed. Then, in the case where a control signal that instructs to start emission of AF assist light is supplied via the communication unit 61, for example, the light emission control unit 77 determines that starting of emission of AF assist light has been instructed, and processing proceeds to Step S13.

In Step S13, the light emission control unit 77 performs control on the light emission unit 32 to emit AF assist light with the light amount set by the light-amount setting unit 76 in Step S11. As a result, the light emission unit 32 emits AF assist light whose amount is adjusted to the light amount.

In Step S14, the light emission control unit 77 determines, in accordance with whether or not the control signal that instructs to finish emission of AF assist light is supplied via the communication unit 61, whether or not finishing of emission of AF assist light has been instructed.

In the case where the light emission control unit 77 determines in Step S14 that finishing of emission of AF assist light has not been instructed, the processing returns to Step S13, and controls is performed so that emission of AF assist light by the light emission unit 32 is continued. Meanwhile, the light emission control unit 77 determines in Step S14 that finishing of emission of AF assist light has been instructed, the processing proceeds to Step S15.

In Step S15, the light emission control unit 77 performs control on the light emission unit 32 to turn off AF assist light, and then, the processing returns to Step S12. Then, similar processing is repeatedly performed thereafter until the power of the external light emission apparatus 13 is turned off or the setting content indicating which of the user's instruction and distance information is to be used regarding the amount of AF assist light, which is stored in the storage unit 73, is changed.

As described above, since the amount of AF assist light can be adjusted in accordance with user's specification in the external light emission apparatus 13, the light emission unit 32 is capable of emitting AF assist light with a light amount suitable for the environment in which the imaging apparatus 11 images a static image. Therefore, for example, the user specifies such a light amount that a person who is an object does not feel dazzling, and the light emission unit 32 emits AF assist light with such a light amount, thereby making it possible to prevent the person from feeling discomfort.

Figure 7:
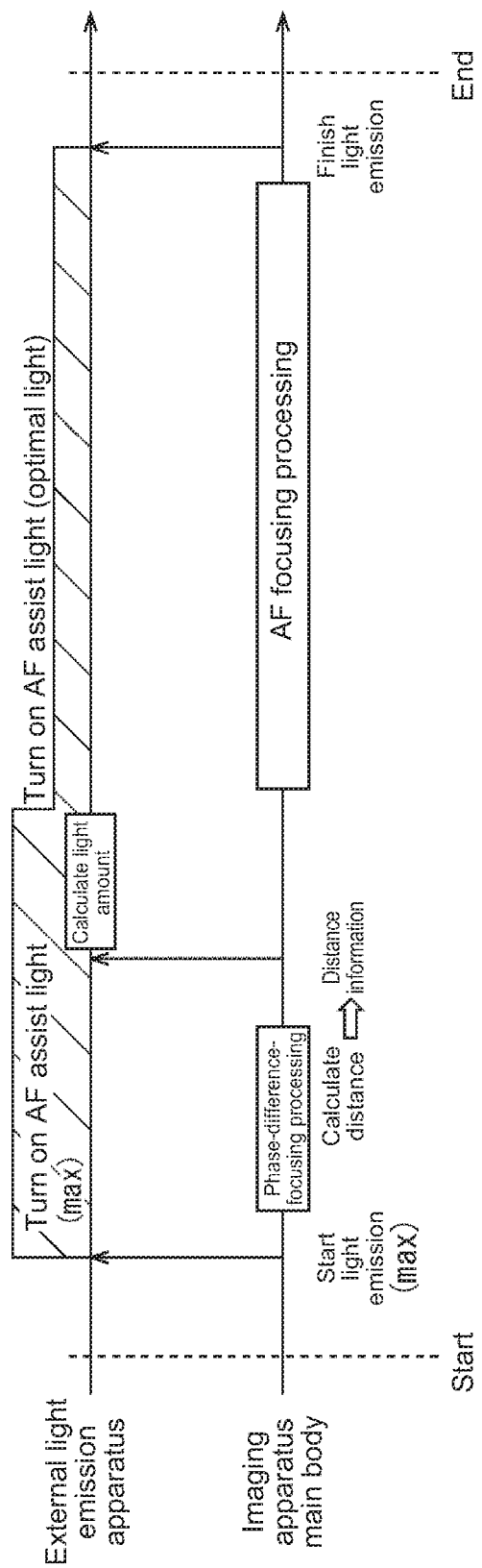
FIG. 7 is a diagram describing a first processing example of light emission control processing of controlling emission of AF assist light with a light amount in accordance with the distance information.

Next, a first processing example of light emission control processing of controlling emission of AF assist light with the light amount according to the distance information will be described with reference to FIG. 7.

For example, in the case where the power of the external light emission apparatus 13 is turned on, the light-amount setting unit 76 refers to the setting content indicating which of the user's instruction and distance information is to be used regarding the amount of AF assist light, which is stored in the storage unit 73, and it is set to use the light amount according to the distance information, this processing is started.

Then, in the imaging apparatus main body 12, in the case where the operation of half-pressing the shutter button 22 is performed, the operation instruction unit 44 supplies, to the light emission control unit 77 of the external light emission apparatus 13 via the communication unit 45, the control signal that instructs to start emission of AF assist light.

In accordance therewith, in the external light emission apparatus 13, the light emission control unit 77 performs control on the light emission unit 32 to emit AF assist light with the maximum light amount as initial light emission so that the phase-difference-focusing processing by the phase-difference-focusing processing unit 46 is surely performed, and the light emission unit 32 applies AF assist light to an object. Therefore, the AF assist light is turned on with the maximum (max) light amount.

Further, in parallel, in the imaging apparatus main body 12, the operation instruction unit 44 supplies, to the phase-difference-focusing processing unit 46, the control signal that instructs to execute autofocusing. In accordance therewith, the phase-difference-focusing processing unit 46 performs phase-difference-focusing processing based on the phase-difference signal supplied from the image plane phase difference pixel of the imaging device 43. Then, the phase-difference-focusing processing unit 46 supplies the distance information obtained by the phase-difference-focusing processing to the AF focusing processing unit 47, and transmits it to the distance information acquisition unit 74 of the external light emission apparatus 13 via the communication unit 45.

Then, in the external light emission apparatus 13, the distance information acquisition unit 74 acquires the distance information supplied from the phase-difference-focusing processing unit 46, and supplies it to the light-amount-calculation processing unit 75. As a result, the light-amount-calculation processing unit 75 calculates the optimal amount of AF assist light according to the distance to an object in accordance with the formula as described above and supplies it to the light-amount setting unit 76, and the light-amount setting unit 76 sets the light amount to the light emission control unit 77. Therefore, the light emission control unit 77 performs control on the light emission unit 32 to emit AF assist light with the optimal light amount, and the AF assist light whose amount is adjusted to the optimal light amount is turned on.

Further, in the imaging apparatus main body 12, the AF focusing processing unit 47 performs, in accordance with the distance information supplied from the phase-difference-focusing processing unit 46, AF focusing processing of focusing on the object at the distance indicated by the distance information to drive the focus lens of the optical system 41 by the AF driving unit 42. Then, after the AF focusing processing is finished, the AF focusing processing unit 47 transmits, to the light emission control unit 77 of the external light emission apparatus 13 via the communication unit 45, the control signal that instructs to finish the emission of AF assist light.

In accordance therewith, in the external light emission apparatus 13, the light emission control unit 77 performs control on the light emission unit 32 to turn off the AF assist light in accordance with the control signal that instructs to finish the emission of AF assist light, and then, the processing is finished.

As described above, in the external light emission apparatus 13, since the amount of AF assist light can be adjusted in accordance with the distance to an object, the light emission unit 32 is capable of emitting AF assist light with a small light amount in the case where, for example, there is a person who is an object nearby. Therefore, in the imaging apparatus 11, for example, it is possible to automatically prevent a person who is an object from feeling dazzling, and perform better imaging. Further, the external light emission apparatus 13 emits AF assist light with the maximum light amount as initial light emission, and thus, the phase-difference-focusing processing unit 46 is capable of surely performing the phase-difference-focusing processing at high speed.

Figure 8:
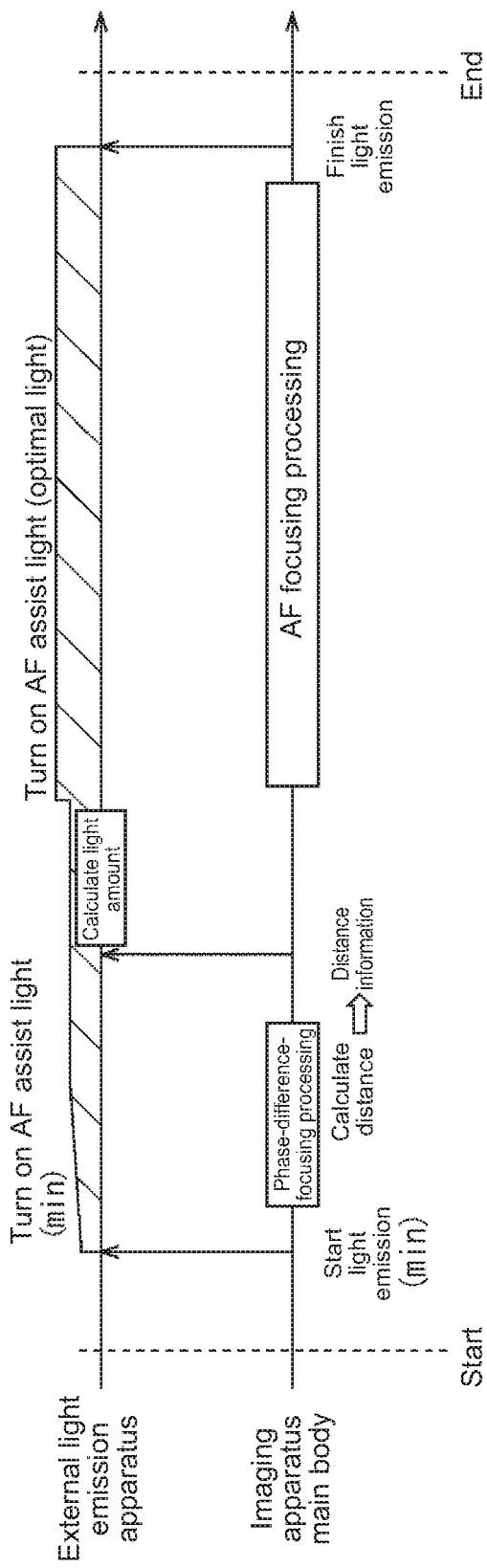
FIG. 8 is a diagram describing a second processing example of the light emission control processing of controlling emission of AF assist light with a light amount in accordance with the distance information.

Next, a second processing example of the light emission control processing of controlling emission of AF assist light with a light amount according to the distance information will be described with reference to FIG. 8.

For example, in the case where the power of the external light emission apparatus 13 is turned on, the light-amount setting unit 76 refers to the setting content indicating which of the user's instruction and distance information is to be used regarding the amount of AF assist light, which is stored in the storage unit 73, and it is set to use the light amount according to the distance information, this processing is started.

Then, in the imaging apparatus main body 12, in the case where the operation of half-pressing the shutter button 22 is performed, the operation instruction unit 44 supplies, to the light emission control unit 77 of the external light emission apparatus 13 via the communication unit 45, the control signal that instructs to start emission of AF assist light.

In accordance therewith, in the external light emission apparatus 13, the light emission control unit 77 performs control on the light emission unit 32 to emit AF assist light with the minimum light amount as initial light emission so that a person who is an object does not feel dazzling, and the light emission unit 32 applies AF assist light to an object. Therefore, AF assist light is turned on with the minimum (min) light amount.

Further, in parallel, in the imaging apparatus main body 12, the operation instruction unit 44 supplies, to the phase-difference-focusing processing unit 46, a control signal that instructs to execute autofocusing. In accordance therewith, the phase-difference-focusing processing unit 46 performs phase-difference-focusing processing based on the phase-difference signal supplied from the image plane phase difference pixel of the imaging device 43.

At this time, in the case where the phase-difference-focusing processing unit 46 cannot obtain distance information because the amount of AF assist light is small, setting of the optimal light amount by the light-amount setting unit 76 is not performed for the light emission control unit 77. Therefore, the light emission control unit 77 performs control on the light emission unit 32 to gradually increase the amount of AF assist light until setting of the optimal light amount is performed by the light-amount setting unit 76. As a result, in the case where AF assist light with such an amount that makes it possible to obtain distance information is applied to an object, the distance information obtained by the phase-difference-focusing processing unit 46 is supplied to the AF focusing processing unit 47 and transmitted to the distance information acquisition unit 74 of the external light emission apparatus 13 via the communication unit 45.

After that, similarly to the processing described with reference to FIG. 7, AF assist light whose amount is adjusted to the optimal light amount is turned on, AF focusing processing by the AF focusing processing unit 47 is performed, AF assist light is turned off, and then, the processing is finished.

As described above, in the external light emission apparatus 13, since the amount of AF assist light can be adjusted in accordance with the distance to an object, the light emission unit 32 is capable of emitting AF assist light with a small amount in the case where, for example, there is a person who is an object nearby. Therefore, in the imaging apparatus 11, for example, it is possible to automatically prevent a person who is an object from feeling dazzling, and perform better imaging.

Further, the external light emission apparatus 13 emits AF assist light with the minimum light amount as initial light emission, and thus, it is possible to surely prevent a person who is an object from feeling discomfort due to dazzling. Further, by gradually increasing the amount of AF assist light, it is possible to avoid a situation in which the phase-difference-focusing processing unit 46 cannot perform the phase-difference-focusing processing.

<Application Examples of Electronic Apparatuses>

The light emission control unit 64 as described above is applicable to various electronic apparatuses including the light emission unit 32 capable of emitting AF assist light and illumination light as well as the imaging apparatus 11 (so-called single lens reflex camera) shown in FIG. 1.

Figure 9A:
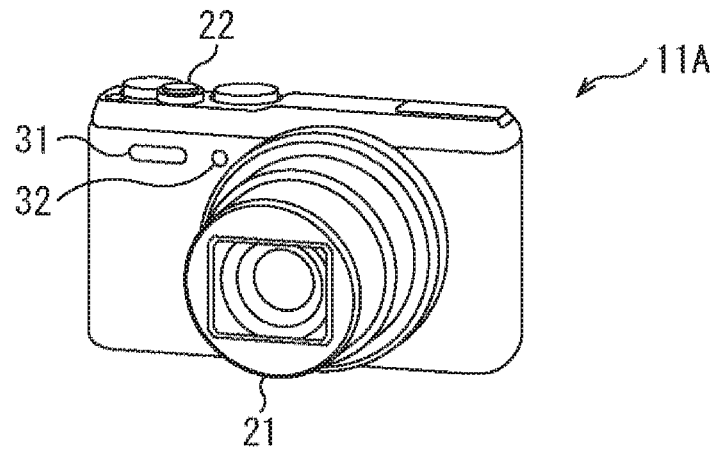
FIGS. 9A, 9B, and 9C is a are diagrams showing an example of various electronic apparatuses to which a light emission control unit can be applied.

For example, as shown in FIG. 9A, the light emission control unit 64 can be applied to a control unit of an imaging apparatus (so-called compact camera) 11A that includes a lens, a flash, and the like integrally formed, and is miniaturized and reduced in weight.

Specifically, in accordance with the operation on the shutter button 22 of the imaging apparatus 11A, the light emission unit 32 emits AF assist light with the optimal light amount, and autofocusing by the AF lens 21 is executed. After that, in the imaging apparatus 11A, the flash unit 31 applies flash light to an object, and a static image is acquired in accordance with the timing.

Figure 9B:
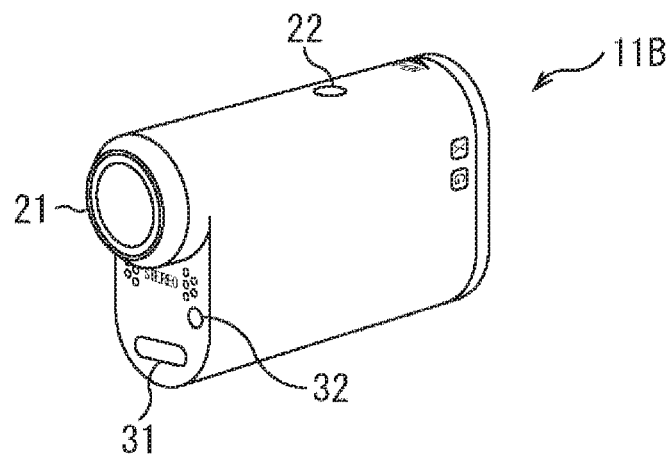

Further, as shown in FIG. 9B, the light emission control unit 64 can be applied to a control unit of an imaging apparatus (so-called action camera) 11B that is assumed to be used in mainly an active scene in outdoor sports.

Specifically, in accordance with the operation on the shutter button 22 of the imaging apparatus 11B, the light emission unit 32 emits AF assist light with the optimal light amount, and autofocusing by the AF lens 21 is executed. After that, in the imaging apparatus 11B, the flash unit 31 applies flash light on an object, and a static image is acquired in accordance with the timing.

Figure 9C:
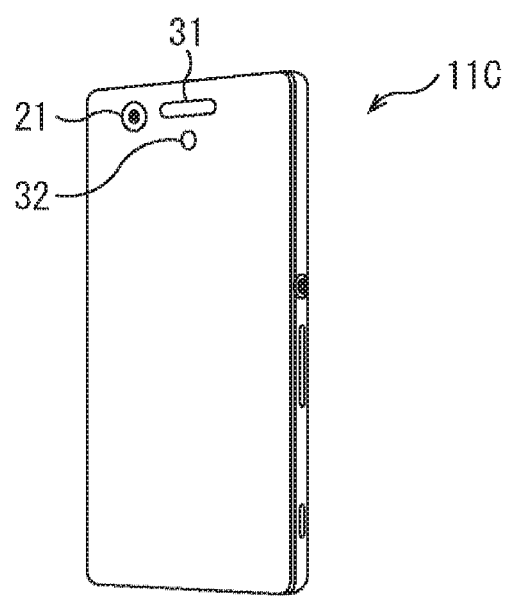

Further, as shown in FIG. 9C, the light emission control unit 64 can be applied to a control unit of a portable communication information terminal (so-called smartphone) 11C having an imaging function.

Specifically, in the communication information terminal 11C, in accordance with the operation on a shutter button GUI (Graphical User Interface) displayed on a display on the back surface side (not shown), the light emission unit 32 emits AF assist light with the optimal light amount, and autofocusing by the AF lens 21 is executed. After that, in the communication information terminal 11C, the flash unit 31 applies flash light to an object, and a static image is acquired in accordance with the timing.

In addition, the light emission control unit 64 may be applied to a control unit of various electronic apparatuses that include the light emission unit 32 capable of emitting AF assist light and illumination light and has an imaging function, and the light emission control unit 64 may perform control on the light emission unit 32.

Note that the setting of the amount of AF assist light in the imaging apparatus 11 is not limited to those based on the user's specification, distance information, or the like described above, and the amount of AF assist light can be appropriately set in accordance with the information acquired by the imaging apparatus 11. For example, in accordance with the focal length of the AF lens 21, the light emission control unit 77 is capable of performing control to increase the amount of AF assist light, because it can be seen that an object is far in the case where the focal length is large. Meanwhile, in accordance with the focal length of the AF lens 21, the light emission control unit 77 is capable of performing control to reduce the amount of AF assist light, because it can be seen that an object is nearby in the case where the focal length is small. Further, the amount of AF assist light according to the focal length of the AF lens 21 can be used as the light amount of initial light emission in the above-mentioned processing with reference to FIG. 8.

Alternatively, in the imaging apparatus 11, the amount of AF assist light may be automatically controlled on the basis of the recognition result by object recognition processing on an object captured in an image. For example, the light emission control unit 77 is capable of performing control to reduce the amount of AF assist light in the case where it is recognized that a person is imaging or a user images himself/herself (so-called selfie). Meanwhile, the light emission control unit 77 is capable of performing control to increase the amount of AF assist light in the case where it is recognized that scenery is being imaged.

Further, in the imaging apparatus 11, the amount of AF assist light may be set in accordance with the orientation of the external light emission apparatus 13 with respect to the optical axis of the AF lens 21. Further, in the case where the orientation of a display of the imaging apparatus main body 12 can be adjusted, the amount of AF assist light may be set in accordance with the positional relationship between the external light emission apparatus 13 and the display. For example, in the case of the positional relationship where selfie is assumed, the amount of AF assist light can be set small.

Further, the imaging apparatus 11 may display the amount of AF assist light on the display unit 62 of the external light emission apparatus 13, and make it possible to adjust (e.g., present candidates of the light amount and select) the light amount to that considered as appropriate by the user. As a result, while performing imaging, the user is capable of changing the AF assist light so that the amount of AF assist light is a more appropriate light amount.

Note that as described above, although the external light emission apparatus 13 is configured to emit, by the light emission unit 32, AF assist light and illumination light, and emit, by the flash unit 31, flash light whose amount is larger than those of AF assist light and illumination light, the present technology is not limited to such a configuration. For example, the external light emission apparatus 13 may be configured to be capable of emitting only AF assist light and/or illumination light, or emitting not only AF assist light and illumination light but also flash light whose amount is larger than those thereof. Further, the external light emission apparatus 13 may be configured to be capable of emitting at least AF assist light and illumination light, and emitting various types of light such as flash light in addition thereto.

<Configuration Example of Computer>

Note that the processing described with reference to the above-mentioned flowcharts does not necessarily need to be performed in time series in the order described as the flowcharts and also includes processing performed in parallel or individually (e.g., parallel processing or processing that uses object). Further, the program may be processed by a single CPU, or may be processed dispersively by a plurality of CPUs.

Further, the above-mentioned sequence of processing (light emission control method) can be performed by hardware or software. If the sequence of processing is performed by software, programs configuring the software are installed into a computer from a program recording medium in which the programs are stored. Here, the computer includes a computer incorporated in dedicated hardware and, for example, a generally-used personal computer that installs various programs to be able to execute various functions.

Figure 10:
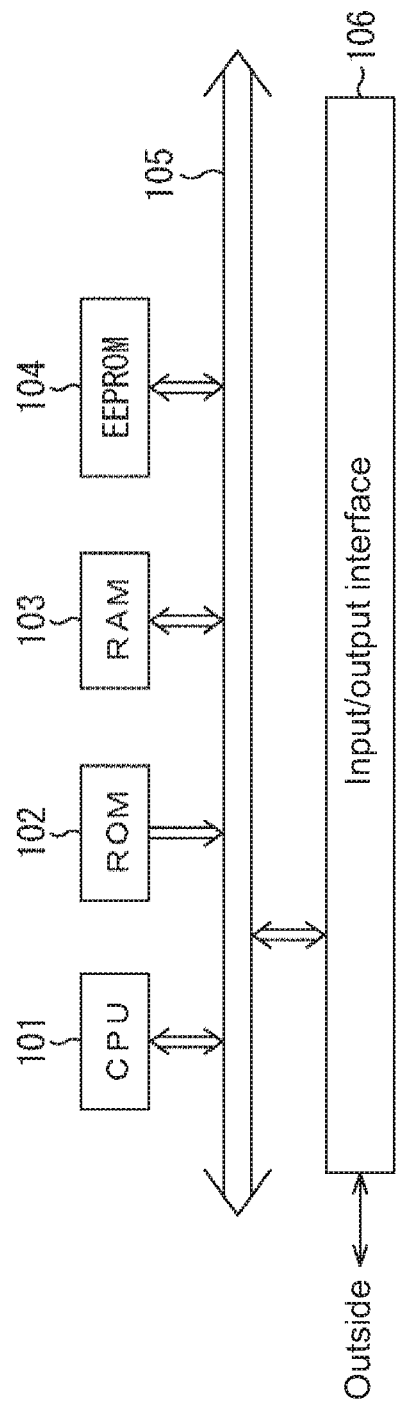
FIG. 10 is a block diagram showing a configuration example of an embodiment of a computer to which the present technology is applied.

FIG. 10 is a block diagram showing a configuration example of hardware of a computer executing the above-mentioned sequence of processing by a program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other via a bus 105. Further, an input/output interface 106 is connected to the bus 105. The input/output interface 106 is connected to the outside.

In the computer configured as described above, by the CPU 101 loading programs stored in, for example, the ROM102 and the EEPROM 104 into the RAM 103 via the bus 105 and executing the programs, the above-mentioned sequence of processing is performed. Further, the program that is executed by the computer (the CPU 101) can be written to the ROM 102 in advance, installed in the EEPROM 104 from the outside via the input/output interface 105, or updated.

Application Examples

The technology according to the present disclosure can be applied to various products.

Figure 11:
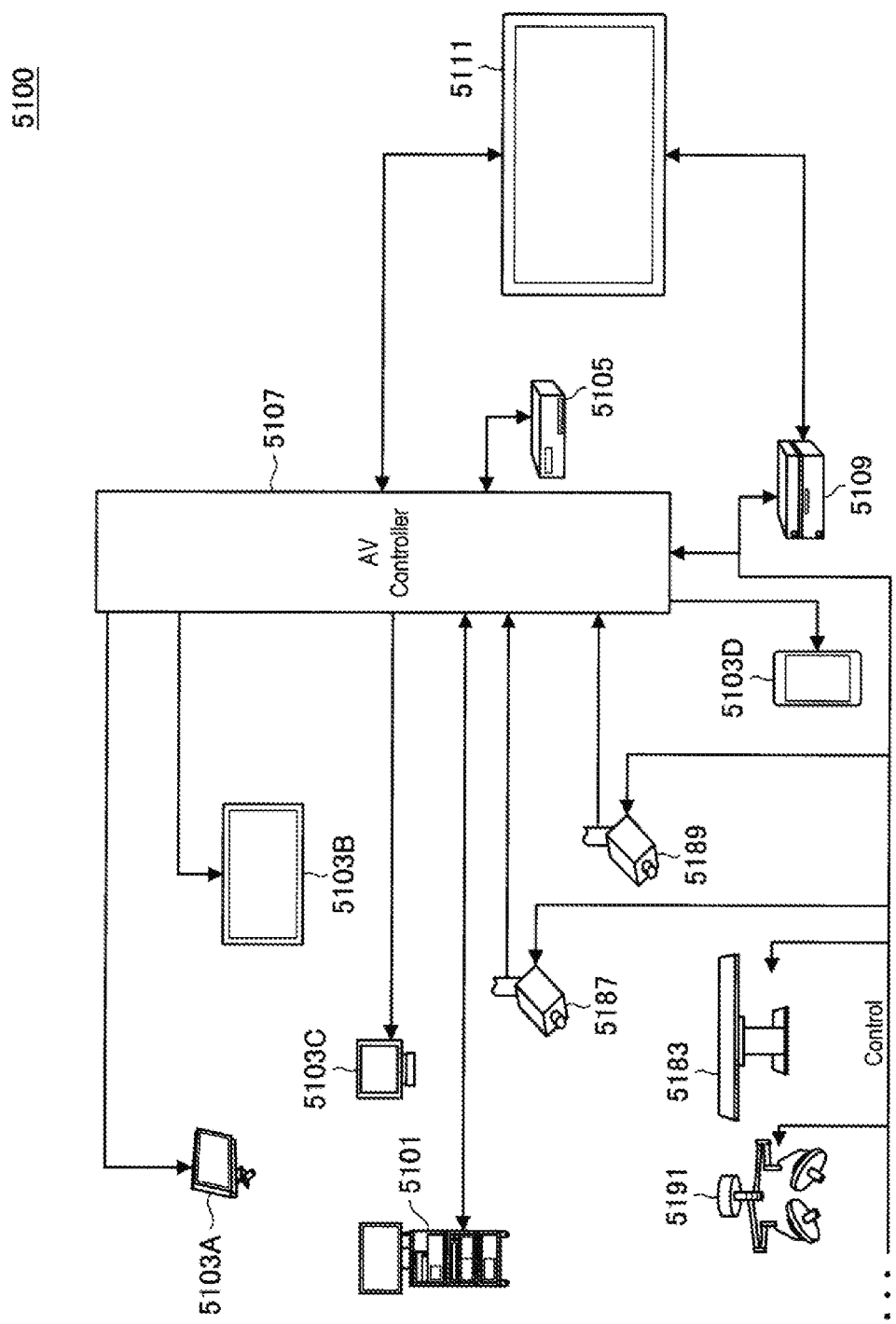
FIG. 11 is a view schematically depicting a general configuration of a surgery room system.

FIG. 11 is a view schematically depicting a general configuration of a surgery room system 5100 to which the technology according to an embodiment of the present disclosure can be applied. Referring to FIG. 11, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 11, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 11, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 12:
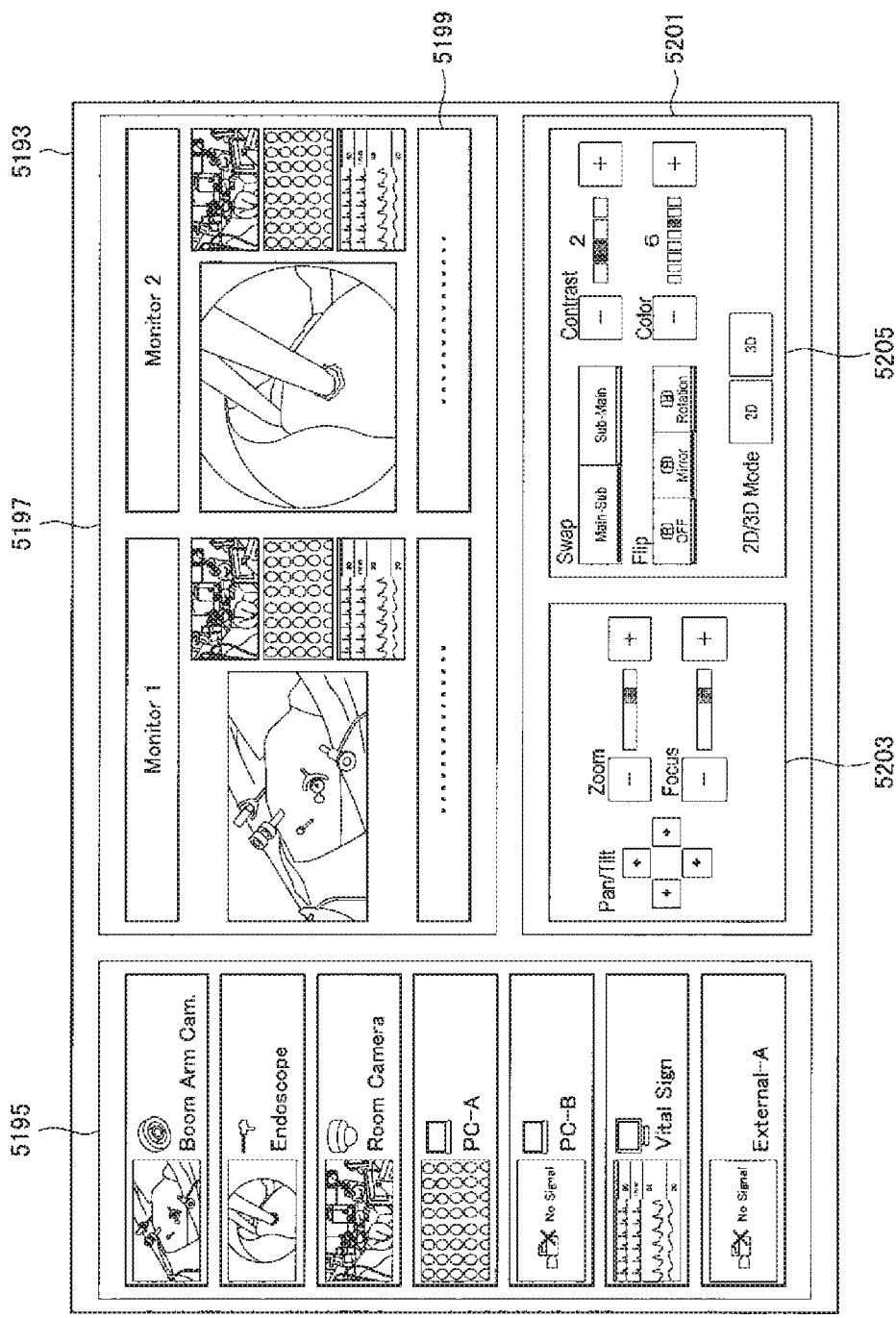
FIG. 12 is a view depicting an example of display of an operation screen image of a centralized operation panel.

FIG. 12 is a view depicting an example of display of an operation screen image on the centralized operation panel 5111. In FIG. 12, as an example, an operation screen image is depicted which corresponds to a case in which two display apparatus are provided as apparatus of an output destination in the surgery room system 5100. Referring to FIG. 12, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment, and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 13:
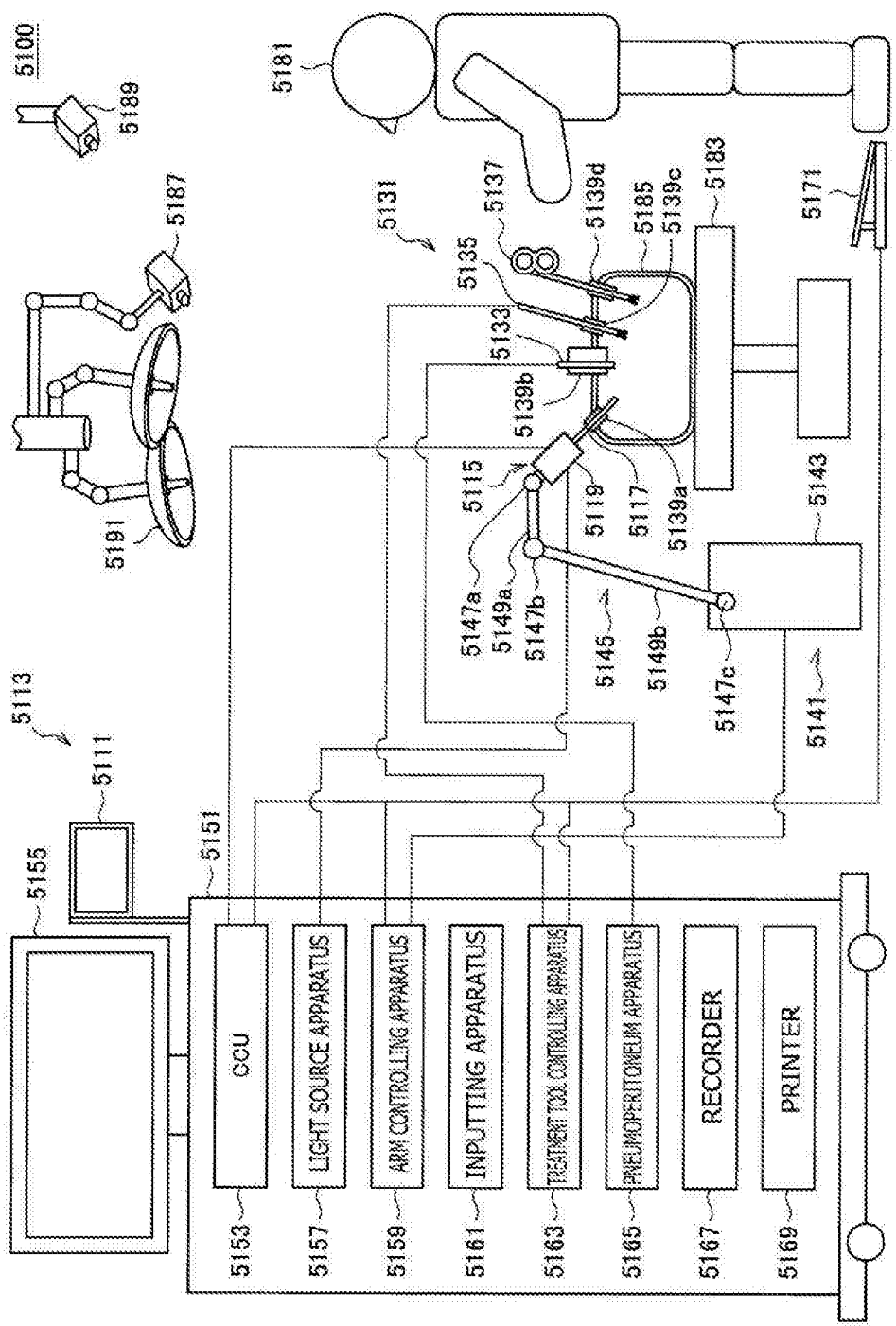
FIG. 13 is a view illustrating an example of a state of surgery to which the surgery room system is applied.

FIG. 13 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 13) as depicted in FIG. 11. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body lumens of the patient 5185 through the trocars 5139*a* to 5139*d*. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 11 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 13, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 14:
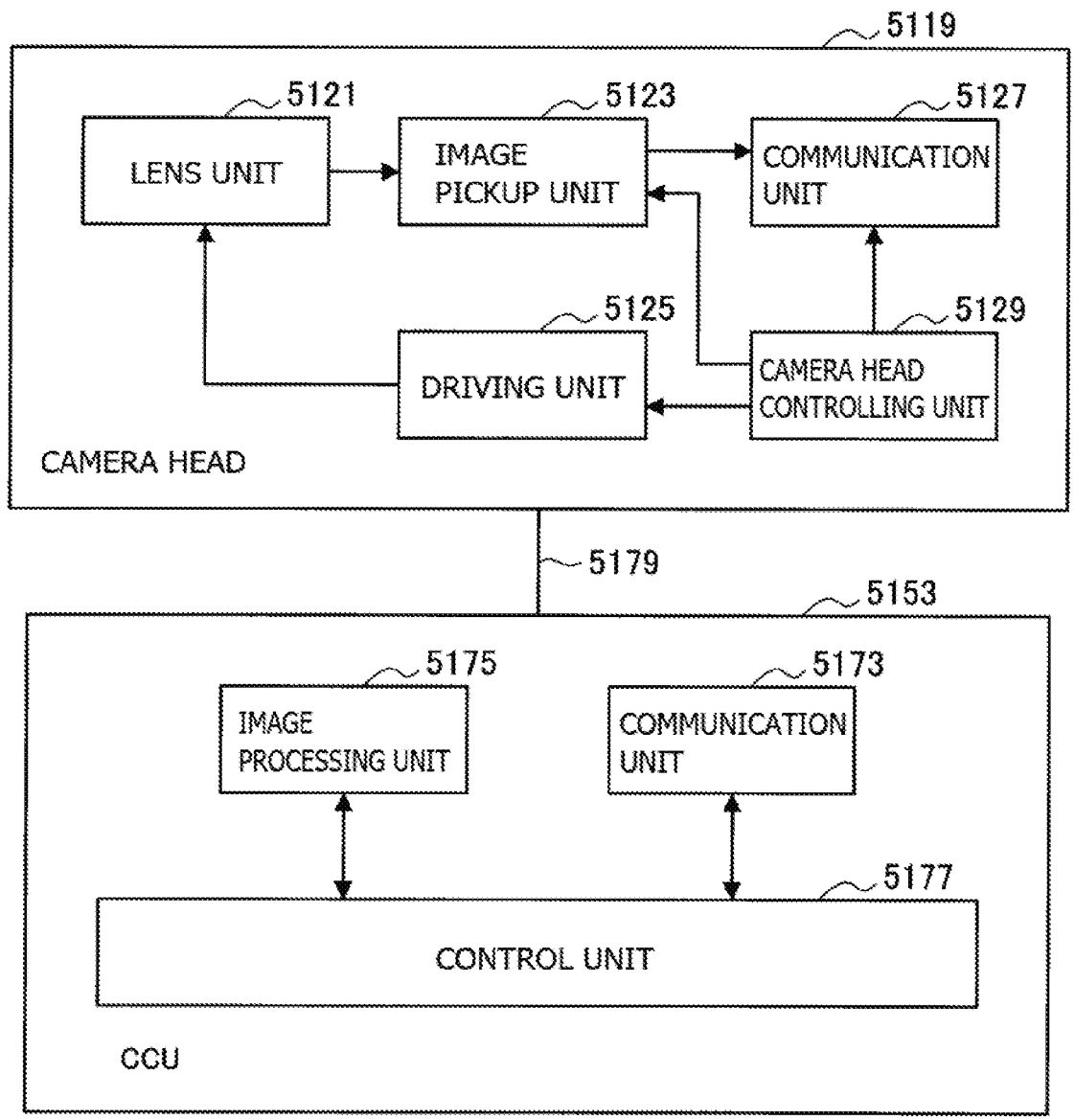
FIG. 14 is a block diagram depicting an example of a functional configuration of a camera head and a camera control unit (CCU) depicted in FIG. 13.

Functions of the camera head 5119 of the endoscope 5115 and the CCU 5153 are described in more detail with reference to FIG. 14. FIG. 14 is a block diagram depicting an example of a functional configuration of the camera head 5119 and the CCU 5153 depicted in FIG. 13.

Referring to FIG. 14, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure can be favorably applied to the light source apparatus 5157 among the configurations described above. Specifically, the light amount when the light source apparatus 5157 applies AF assist light can be controlled to be any one of the high level and the low level in accordance with the user's setting, or controlled in accordance with the distance information as described with reference to FIG. 7 or FIG. 8. By performing adjustment to achieve a light amount suitable for the situation as described above, it is possible to prevent an image that the surgeon 5181 feels dazzling from being displayed, and perform surgery more favorably.

Further, the technology according to the present disclosure may be applied to detection processing on an image signal when executing AF, AE (Automatic Exposure), or AWB (Auto White Balance). Specifically, light emission of the light source apparatus 5157 is controlled so that light of a high level is applied for only a short time necessary for capturing an image for the detection. Then, by stopping display of the image while the light source apparatus 5157 applies the light of a high level, it is possible to prevent the surgeon 5181 from watching an image to which the light of a high level is applied, and provide a more favorable surgery environment in which he/she does not feel dazzling due to strong light.

<Combination Example of Configurations>

It should be noted that the present technology may take the following configurations.

(1)

A light emission control apparatus, including:

a light-amount setting unit that sets an amount of AF (Auto Focus) assist light; and a light emission control unit that controls emission of the AF assist light in accordance with the setting by the light-amount setting unit.

(2)

The light emission control apparatus according to (1) above, in which the light emission control unit performs control on a light emission unit to emit light with the amount of AF assist light set by the light-amount setting unit, the light emission unit being capable of emitting the AF assist light and illumination light.

(3)

The light emission control apparatus according to (1) above, in which the amount of AF assist light is obtained in accordance with a distance to the object to be focused on or specification by a user.

(4)

The light emission control apparatus according to (2) or (3) above, further including:

a distance information acquisition unit that acquires distance information indicating a distance to the object to be focused on; and a light-amount-calculation processing unit that performs, on a basis of the distance information acquired by the distance information acquisition unit, processing of calculating the amount of AF assist light, in which the light emission control unit performs control on the light emission unit to emit light with the amount of AF assist light obtained by the light-amount-calculation processing unit.

(5)

The light emission control apparatus according to (4) above, in which the light emission control unit performs control on the light emission unit to apply the AF assist light to the objet with a light amount of initial light emission of a specified level, the light-amount-calculation processing unit obtains, on a basis of the distance information regarding the object to which the AF assist light is applied with the light amount of the specified level, an appropriate amount of the AF assist light according to a distance to the object, and the light emission control unit performs control on the light emission unit to emit the AF assist light with the appropriate amount of AF assist light obtained by the light-amount-calculation processing unit.

(6)

The light emission control apparatus according to (5), in which the light emission control unit controls the emission of the AF assist light using a maximum amount of light by the light emission unit as the initial light emission of the specified level.

(7)

The light emission control apparatus according to (5), in which the light emission control unit controls the emission of the AF assist light using a minimum amount of light by the light emission unit as the initial light emission of the specified level, and performs control on the light emission unit to gradually increase the amount of AF assist light until the distance information is acquired.

(8)

The light emission control apparatus according to any one of (2) to (7) above, in which the light emission control unit performs control on the light emission unit to emit light with the amount of AF assist light set in accordance with specification by a user.

(9)

The light emission control apparatus according to (8) above, in which the light emission control unit performs control on the light emission unit to emit light with the amount of AF assist light set by multiple stages of levels, the multiple stages being two or more stages.

(10)

The light emission control apparatus according to (8) or (9) above, in which the light emission control unit performs control on the light emission unit to emit light with the amount of AF assist light set in two stages of a high level and a low level.

(11)

The light emission control apparatus according to any one of (8) to (10) above, in which the light emission control unit performs control on the light emission unit to emit light with the amount of AF assist light set in association with an imaging mode specified by the user.

(12)

The light emission control apparatus according to any one of (1) to (11) above, in which the light emission control unit controls the amount of AF assist light on a basis of a result of recognizing an object captured in a captured image.

(13)

The light emission control apparatus according to any one of (1) to (12) above, in which the light emission control unit controls the amount of AF assist light on a basis of a focal length of an AF lens used for capturing an image.

(14)

A light emission control method, including the steps of:
setting an amount of AF (Auto Focus) assist light; and
controlling emission of the AF assist light in accordance with the setting.

(15)

A program that causes a computer to execute processing including the steps of:
setting an amount of AF (Auto Focus) assist light; and
controlling emission of the AF assist light in accordance with the setting.

(16)

A light emission apparatus, including:
a light emission unit capable of emitting AF (Auto Focus) assist light;
a light-amount setting unit that sets an amount of the AF assist light; and
a light emission control unit that performs control on the light emission unit in accordance with the setting by the light-amount setting unit.

(17)

An imaging apparatus, including
a light emission apparatus including
a light emission unit capable of emitting AF (Auto Focus) assist light,
a light-amount setting unit that sets an amount of the AF assist light, and
a light emission control unit that performs control on the light emission unit in accordance with the setting by the light-amount setting unit.

Note that this embodiment is not limited to the above-mentioned embodiment and various modifications can be made without departing from the essence of the present disclosure.

REFERENCE SIGNS LIST 11 imaging apparatus
12 imaging apparatus main body
13 external light emission apparatus
21 AF lens
22 shutter button
31 flash unit
32 light emission unit
41 optical system
42 AF driving unit
43 imaging device
44 operation instruction unit
45 communication unit
46 phase-difference-focusing processing unit
47 AF focusing processing unit
48 image processing circuit
49 monitor
50 memory
61 communication unit
62 display unit
63 operation unit
64 light emission control unit 71 operation information acquisition unit
72 menu-screen-display control unit
73 storage unit
74 distance information acquisition unit
75 light-amount-calculation processing unit,
76 light-amount setting unit
77 light emission control unit
78 flash control unit

The invention claimed is:

1. A light emission control apparatus, comprising:
a central processing unit (CPU) configured to:
acquire distance information indicating a distance from the light emission control apparatus to an object;
calculate a first amount of Auto Focus (AF) assist light based on the acquired distance information; and
control a light emitting device to emit the first amount of the AF assist light.

2. The light emission control apparatus according to claim 1, wherein the CPU is further configured to control the light emitting device to emit illumination light.

3. The light emission control apparatus according to claim 1, wherein the CPU is further configured to:
control unit performs control the light emitting device to apply the AF assist light, to the object, with a light amount of initial light emission of a specified level of the AF assist light;
calculate a second amount of the AF assist light based on the distance information of the object to which the AF assist light is applied with the light amount of the specified level; and
control the light emitting device to emit the second amount of the AF assist light.

4. The light emission control apparatus according to claim 3, wherein the CPU is further configured to control the light emitting device to emit a maximum amount of the AF assist light as the initial light emission of the specified level.

5. The light emission control apparatus according to claim 3, wherein the CPU is further configured to control the light emitting device to:
emit a minimum amount of the AF assist light as the initial light emission of the specified level; and
control the second amount of the AF assist light to increase until light until the distance information is acquired.

6. The light emission control apparatus according to claim 1, wherein the CPU is further configured to:
set the first amount of the AF assist light based on a plurality of stages of the AF assist light; and
control the light emitting device to emit the set first amount of the AF assist light.

7. The light emission control apparatus according to claim 6, wherein the plurality of stages includes a high level and a low level.

8. The light emission control apparatus according to claim 1, wherein the CPU is further configured to:
set the first amount of the AF assist light based on a user specified imaging mode; and
control the light emitting device to emit the set first amount of the AF assist light.

9. The light emission control apparatus according to claim 1, wherein the CPU is further configured to control the first amount of AF assist light based on a result of recognition of the object in a captured image.

10. The light emission control apparatus according to claim 1, wherein the CPU is further configured to control the first amount of AF assist light based on a focal length of an AF lens that captures an image of the object.

11. A light emission control method, comprising:
acquiring, by a central processing unit (CPU) of a light emission control apparatus, distance information indicating a distance from the light emission control apparatus to an object;
calculating, by the CPU, an amount of Auto Focus (AF) assist light based on the acquired distance information; and
controlling, by the CPU, a light emitting device to emit the amount of the AF assist light.

12. A non-transitory computer-readable medium having stored thereon, computer-executable instructions that when executed by a processor, cause the processor to execute operations, the operations comprising:
acquiring distance information indicating a distance from a light emission control apparatus to an object;
calculating an amount of Auto Focus (AF) assist light based on the acquired distance information; and
controlling a light emitting device to emit the amount of the AF assist light.

13. A light emission apparatus, comprising:
a light emitting device configured to emit Auto Focus (AF) assist light; and
a central processing unit (CPU) configured to:
acquire distance information indicating a distance from the light emission apparatus to an object;
calculate an amount of the AF assist light based on the acquired distance information; and
control the light emitting device to emit the amount of the AF assist light.

14. An imaging apparatus, comprising:
a light emission apparatus, wherein the light emission apparatus comprises:
a light emitting device configured to emit Auto Focus (AF) assist light; and
a central processing unit (CPU) configured to:
acquire distance information indicating a distance from the light emission apparatus to an object;
calculate an amount of the AF assist light based on the acquired distance information; and
control the light emitting device to emit the amount of the AF assist light.

* * * * *